United States Patent
Cho et al.

(10) Patent No.: US 11,390,153 B2
(45) Date of Patent: Jul. 19, 2022

(54) VIBRATION DAMPING DEVICE FOR VEHICLE

(71) Applicant: DAEHEUNG RUBBER & TECHNOLOGY CO., LTD., Gimhae-si (KR)

(72) Inventors: Hee Ho Cho, Gimhae-si (KR); Jun Bok Kang, Gimhae-si (KR)

(73) Assignee: DAEHEUNG RUBBER & TECHNOLOGY CO., LTD., Gimhae-si (KR)

( * ) Notice: Subject to any disclaimer, the term of this patent is extended or adjusted under 35 U.S.C. 154(b) by 0 days.

(21) Appl. No.: 17/226,032

(22) Filed: Apr. 8, 2021

(65) Prior Publication Data

US 2022/0153114 A1 May 19, 2022

(30) Foreign Application Priority Data

Nov. 19, 2020 (KR) .......................... 10-2020-0155601

(51) Int. Cl.
*B60K 5/12* (2006.01)
*F16F 15/08* (2006.01)

(52) U.S. Cl.
CPC ............ *B60K 5/1208* (2013.01); *F16F 15/08* (2013.01)

(58) Field of Classification Search
USPC ................................. 248/559, 566, 562, 638
See application file for complete search history.

(56) References Cited

U.S. PATENT DOCUMENTS

| | | | |
|---|---|---|---|
| 9,016,674 B2 * | 4/2015 | Kim | F16F 13/26 267/140.14 |
| 10,619,697 B2 | 4/2020 | Han et al. | |
| 2005/0206056 A1 * | 9/2005 | Maeno | F16F 13/106 267/141 |
| 2005/0275145 A1 * | 12/2005 | Muraoka | F16F 13/268 267/140.14 |
| 2006/0006593 A1 * | 1/2006 | Bretaudeau | F16F 13/268 267/140.14 |
| 2006/0097435 A1 * | 5/2006 | Yoneyama | F16F 13/105 267/140.11 |
| 2008/0284075 A1 * | 11/2008 | Saito | F16F 13/105 267/140.13 |
| 2011/0042873 A1 * | 2/2011 | Yamamoto | F16F 13/264 267/140.14 |
| 2013/0264756 A1 * | 10/2013 | Daito | F16F 13/08 267/140.13 |
| 2014/0175719 A1 * | 6/2014 | Kanaya | F16F 13/106 267/140.13 |

* cited by examiner

*Primary Examiner* — Alfred J Wujciak
(74) *Attorney, Agent, or Firm* — Revolution IP, PLLC (57) ABSTRACT

Proposed is a vibration damping device for a vehicle as an engine mount for a vehicle, wherein the vibration damping device solves the problem of vibration increase which may occur in the natural frequency of a rubber insulator by allowing the rubber insulator to have a plurality of unit insulation bodies having different natural frequencies, wherein the vibration damping device for a vehicle includes a center core, and the rubber insulator having an insulation body provided between the center core and a cylindrical casing, wherein the insulation body includes a plurality of separation grooves formed therein to have shapes extending in radial directions such that the insulation body is divided into a plurality of unit insulation bodies along a circumferential direction of the insulation body.

3 Claims, 8 Drawing Sheets

[Fig. 1]

Prior Art

VIBRATION DAMPING DEVICE FOR VEHICLE

CROSS REFERENCE TO RELATED APPLICATION

The present application claims priority to Korean Patent Application No. 10-2020-0155601, filed Nov. 19, 2020, the entire contents of which is incorporated herein for all purposes by this reference.

BACKGROUND OF THE INVENTION

Field of the Invention

The present disclosure relates generally to a vibration damping device for a vehicle. More particularly, the present disclosure relates to a vibration damping device for a vehicle, which is used as an engine mount for a vehicle or a motor mount for an electronic vehicle.

Description of the Related Art

During the operation of a vehicle, vibration and impact occur. Such vibration and impact include vibration generated from a power train such as an engine or transmission, vibration generated when vehicle wheels contact a road surface, and impact due to unevenness of a road.

In order to reduce such vibration and impact, a vehicle is equipped with various vibration damping devices.

As a kind of the vibration damping device, an engine mount for a vehicle is widely being used and a motor mount for a driving motor of an electronic vehicle begins to be used.

The engine mount for a vehicle is provided between the engine and body of the vehicle and supports the engine, and damps noise and vibration transmitted from the engine.

Such an engine mount is largely divided into a rubber-type engine mount, an air damping mount, and a liquid-sealed engine mount.

The rubber-type engine mount is configured to achieve a damping effect by using the elastic force of a rubber insulator. When an engine housing is seated on and bolted to a central core, the rubber insulator is elastically transformed and restored according to engine vibration to attenuate the vibration.

The air damping mount has damping force obtained by flowing air to working fluid in addition to the damping force of an insulator. The insulator is installed inside a housing, and a lower plate is mounted to the lower part of the housing to constitute a chamber. An air hole is formed in the chamber such that air enters and exits from the chamber according to the elastic transformation of the insulator.

The liquid-sealed engine mount, that is, a hydro engine mount, is configured to generate additional damping force by allowing liquid sealed under an insulator to flow through upper and lower liquid chambers. The liquid-sealed engine mount has the advantage of attenuating both high frequency vibration (low displacement vibration) and low frequency vibration (high displacement vibration) depending on a situation.

Figure 1:
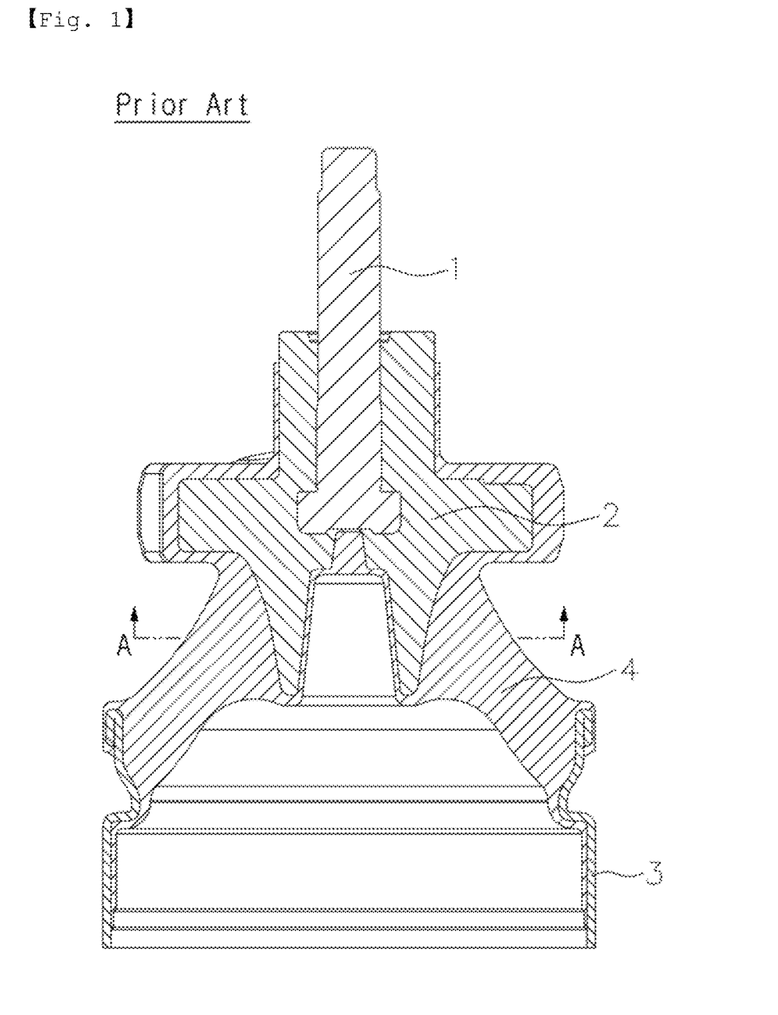
FIG. 1 is a sectional view illustrating a section of a main structure of a normal engine mount of a conventional technology.
Figure 2:
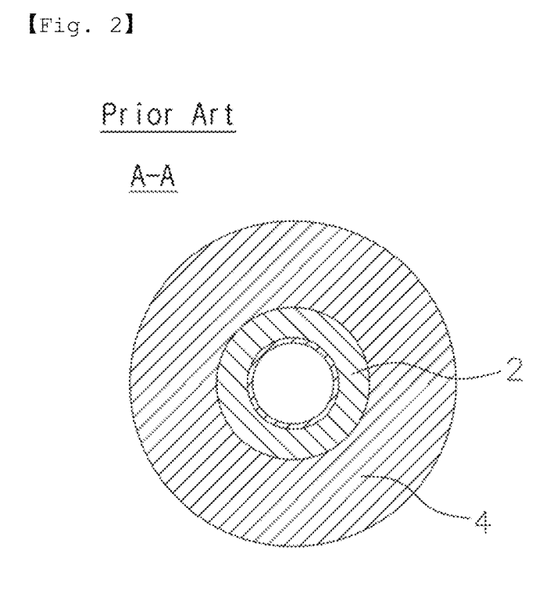
FIG. 2 is a cross-sectional view taken along line A-A of FIG. 1.

FIG. 1 is a sectional view illustrating a section of a main structure of a normal engine mount of a conventional technology, and FIG. 2 is a cross-sectional view taken along line A-A of FIG. 1.

As illustrated in the drawings, in the conventional normal engine mount, a center core 2 is coupled to a vehicle engine by a center bolt 1 inserted into the center of the center core 2; a cylindrical casing 3 is coupled to a vehicle body; and a rubber insulator 4 having a conical shape vulcanized and bonded to the center core 2 and to the cylindrical casing 3 is elastically transformed according to the vibration of the vehicle engine to attenuate the vibration.

Accordingly, during the operation of an internal combustion engine (or during the operation of a motor of the electronic vehicle), the rubber insulator 4 reduces various vibrations input continuously, but when the input frequency of input vibration matches the natural frequency of the rubber insulator 4, the vibration is increased.

To solve the problem of vibration increase which may occur in the natural frequency, various methods have been sought as described below, but cannot be considered as practical alternatives.

(1) In order to reduce resonance energy, the damping value of the rubber insulator may be increased, but when the damping value increases, the value of the dynamic spring characteristics of the rubber insulator also increases in proportion thereto, so the rubber insulator generates large vibration in a general use area.

(2) Although it is possible to adjust peak frequency by adjusting the stiffness of the rubber insulator, the stiffness of the rubber insulator is required to be limited to the range of the stiffness value of the rubber insulator required by a vibration damping system, so the stiffness adjustment of the rubber insulator is limited. As a result, it is difficult to obtain a satisfactory effect.

(3) The problem of vibration increase in the natural frequency can be solved by installing a separate dynamic vibration absorption device, but this is not practical due to installation price and weight thereof, and may cause additional problems in different frequency domains in consideration of various input frequencies.

SUMMARY OF THE INVENTION

Accordingly, the present disclosure has been made keeping in mind the above problems occurring in the related art, and the present disclosure is intended to propose a vibration damping device for a vehicle as an engine mount for a vehicle, wherein the vibration damping device solves the problem of vibration increase which may occur in the natural frequency of a rubber insulator by allowing the rubber insulator to have a plurality of unit insulation bodies having different natural frequencies.

In order to achieve the above objective, according to one aspect of the present disclosure, there is provided a vibration damping device for a vehicle, the vibration damping device including: a center core; a cylindrical casing spaced apart from the center core and provided under the center core; and a rubber insulator having a radial inner side of an upper end part of the rubber insulator bonded to the center core and having a radial outer side of a lower end part of the rubber insulator bonded to an inner circumferential surface of the cylindrical casing and comprising an insulation body having a conical shape extending radially outward and downward from the center core to the cylindrical casing, wherein the insulation body comprises a plurality of separation grooves formed in the insulation body to have shapes extending in radial directions such that the insulation body is divided into a plurality of unit insulation bodies along a circumferential direction of the insulation body, and one or more unit insulation bodies have different natural frequencies.

One or more unit insulation body-facing surfaces facing the unit insulation bodies in the center core may have a protrusion for adjusting natural frequency.

Each of the separation grooves may not pass through the insulation body and may have a shape of a groove indented from an inner circumferential surface of the insulation body toward an outer circumferential surface of the insulation body.

As described above, according to the present disclosure, a vibration damping device for a vehicle as an engine mount for a vehicle can solve the problem of vibration increase which may occur in the natural frequency of the rubber insulator by allowing the rubber insulator to have a plurality of unit insulation bodies having different natural frequencies, thereby decreasing the resonance energy of the rubber insulator.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, the exemplary embodiment of the present disclosure will be described in detail with reference to the accompanying drawings so that those skilled in the art to which the present disclosure belongs can easily embody the present disclosure. However, the present disclosure may be embodied in various different forms and is not limited to the embodiment described herein. In addition, in the drawings, parts irrelevant to the description of the present disclosure are omitted in order to clearly describe the present disclosure, and similar reference numerals are assigned to similar parts throughout the specification.

Throughout the specification, when a part "includes" a certain component, it means that other components may be further included rather than excluding the other components unless specifically stated to the contrary.

Figure 3:
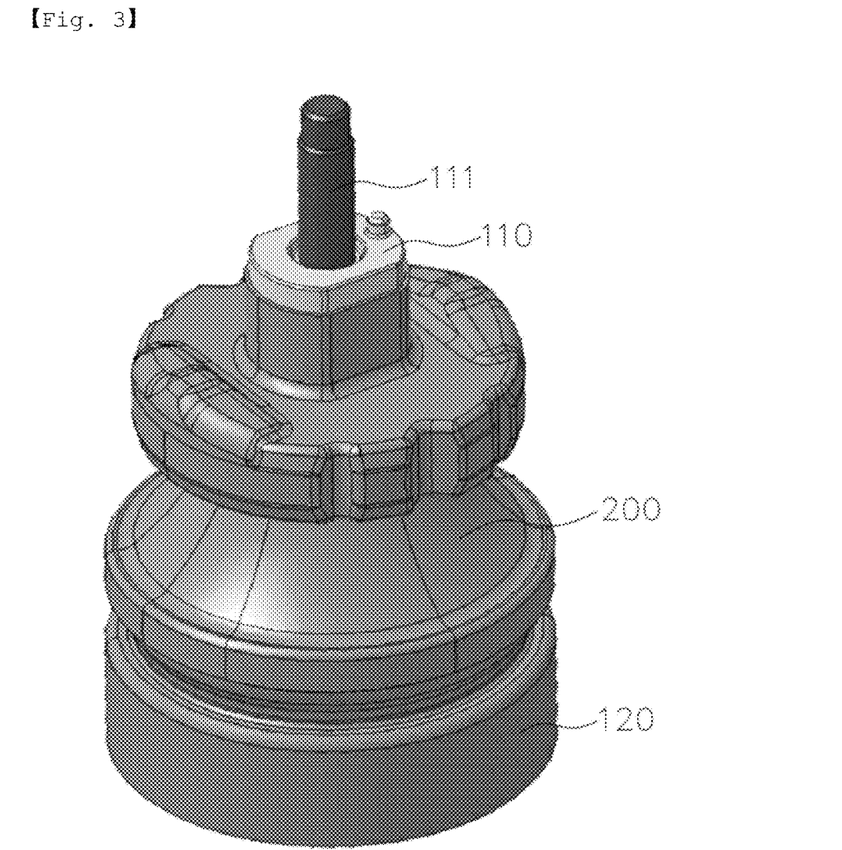
FIG. 3 is a perspective view of a vibration damping device for a vehicle according to an embodiment of the present disclosure.
Figure 4:
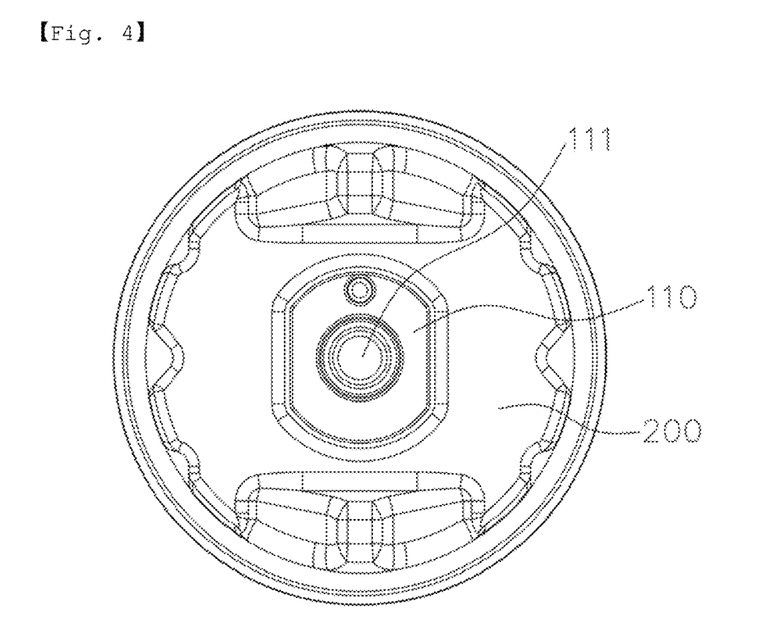
FIG. 4 is a top plan view of FIG. 3.
Figure 5:
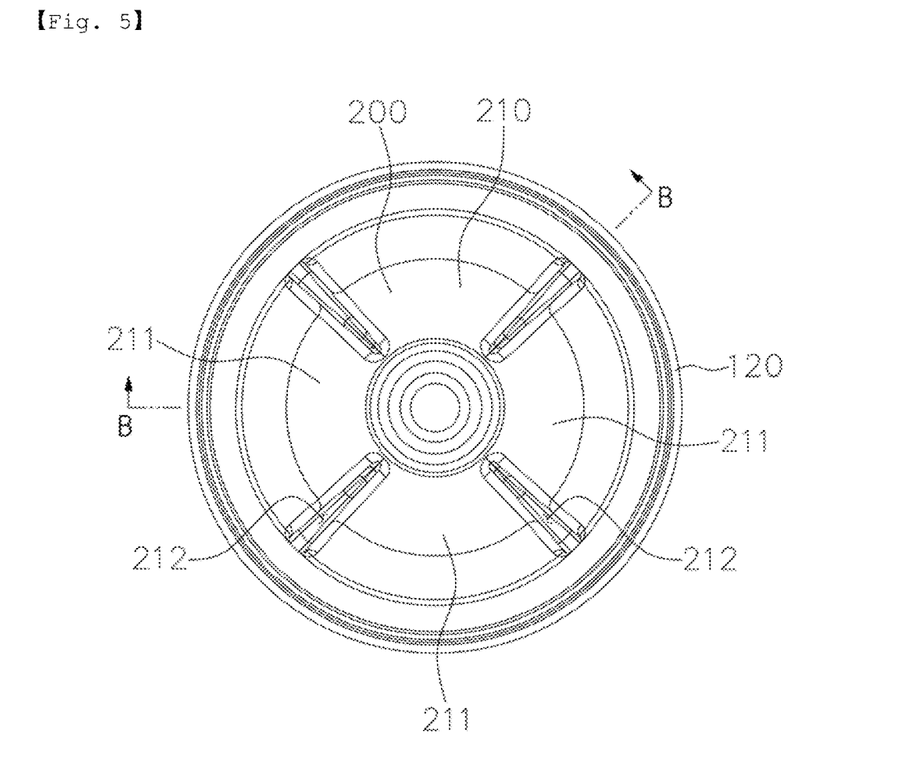
FIG. 5 is a bottom view of FIG. 3.
Figure 6:
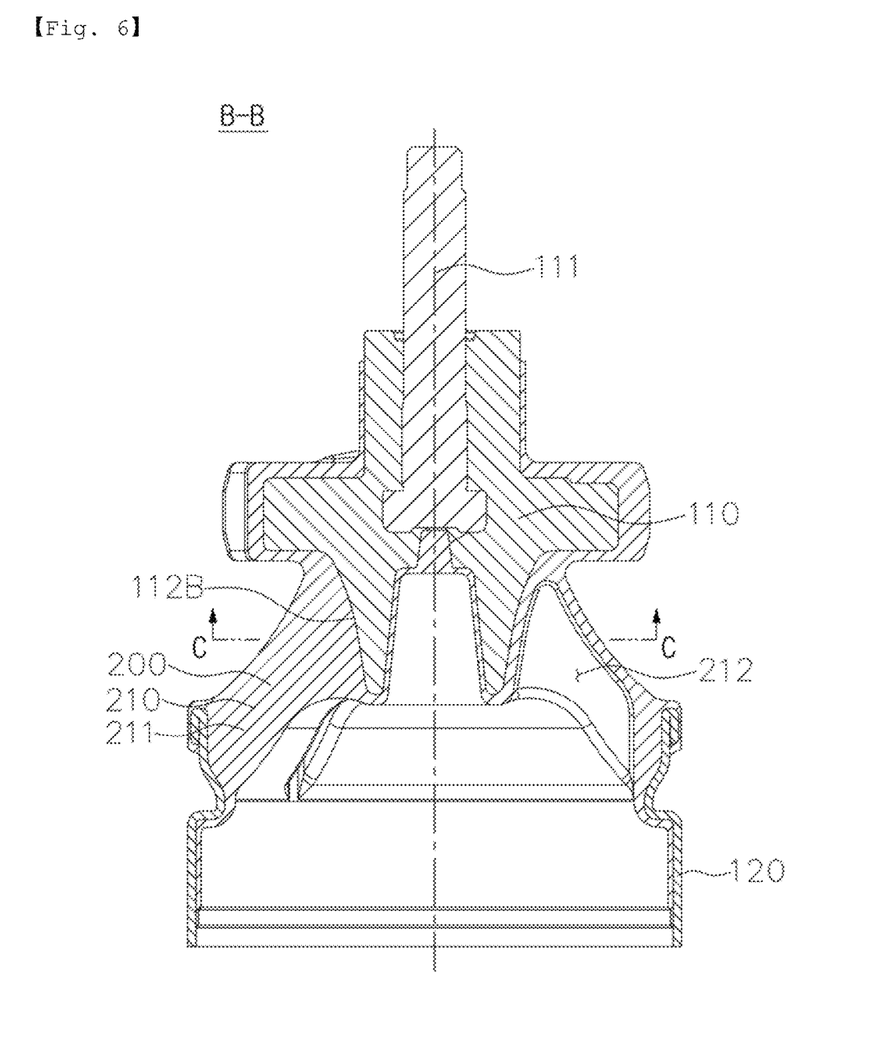
FIG. 6 is a sectional view taken along line B-B of FIG. 5.
Figure 7:
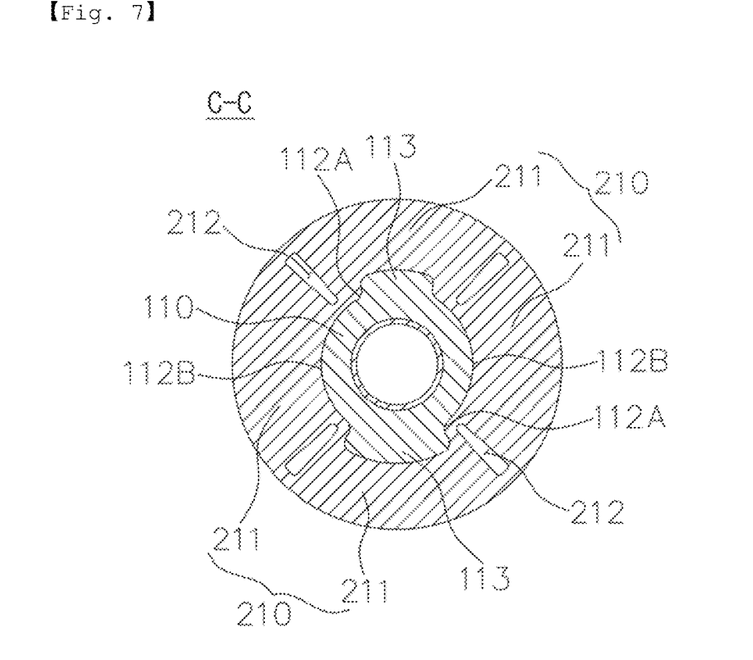
FIG. 7 is a cross-sectional view taken along line C-C of FIG. 6.
Figure 8:
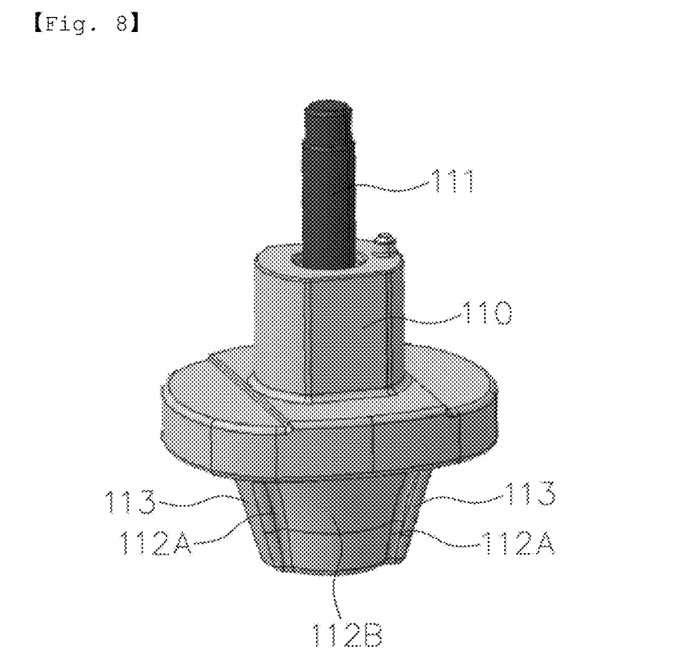
FIG. 8 is a perspective view of a center core of FIG. 3.

FIG. 3 is a perspective view of a vibration damping device for a vehicle according to an embodiment of the present disclosure; FIG. 4 is a top plan view of FIG. 3; FIG. 5 is a bottom view of FIG. 3; FIG. 6 is a sectional view taken along line B-B of FIG. 5; FIG. 7 is a cross-sectional view taken along line C-C of FIG. 6; and FIG. 8 is a perspective view of a center core of FIG. 3.

The vibration damping device 100 for a vehicle is configured by including a center core 110, a cylindrical casing 120, and a rubber insulator 200.

A center bolt 111 is coupled to the center core 110 such that the center core 110 is coupled to an engine.

The cylindrical casing 120 is spaced apart from the center core 110 and is provided under the center core 110, and generally has a cylindrical shape.

The rubber insulator 200 is vulcanized and bonded to the center core 110 and to the cylindrical casing 120.

In the rubber insulator 200, a radial inner side of an upper end part of the rubber insulator is bonded to the center core 110, and a radial outer side of a lower end part of the rubber insulator is bonded to the inner circumferential surface of the cylindrical casing 120.

In addition, the rubber insulator 200 is a component for substantially reducing vibration and impact and includes the insulation body 210 formed therein.

The insulation body 210 has a conical shape extending radially outward and downward from the center core 110 to the cylindrical casing 120.

In the present disclosure, the insulation body 210 is divided into a plurality of unit insulation bodies 211 by a plurality of separation grooves 212.

The separation grooves 212 are formed in the insulation body 210 to have shapes extending in radial directions, and particularly, in the embodiment, each of the separation grooves 212 does not pass through the insulation body, but has a shape of a groove indented from the inner circumferential surface of the insulation body 210 toward the outer circumferential surface thereof.

The insulation body 210 is divided into the plurality of unit insulation bodies 211 along the circumferential direction of the insulation body 210 by the separation grooves 212.

Specifically, the inner circumferential surface of the insulation body 210 is clearly divided into four unit insulation bodies 211 by the separation grooves 212, but the separation grooves are not formed on the outer circumferential surface of the insulation body 210, and the unit insulation bodies 211 are connected to each other and constitute one insulation body 210. However, the outer circumferential surface of the insulation body 210 (the outer part of the separation grooves 212) cannot be considered to substantially reduce vibration and impact, and functions only as a membrane.

In the embodiment, the insulation body 210 has four separation grooves 212 formed therein, and is divided into the four unit insulation bodies 211.

Furthermore, a face 112 facing each of the unit insulation bodies (hereinafter, referred to as "a unit insulation body-facing surface") is formed on the center core 110, and in the embodiment, four unit insulation body-facing surfaces 112 are formed on the center core 110.

In addition, a protrusion 113 for adjusting natural frequency is formed on some of unit insulation body-facing surface 112 by protruding therefrom, the protrusion 113 for adjusting natural frequency having a protruding height different from a protruding height of a protrusion 113 for adjusting natural frequency formed on another unit insulation body-facing surface.

In the case of the embodiment, the protrusion 113 for adjusting natural frequency is formed on each of two unit insulation body-facing surfaces 112A, and the protrusion for adjusting natural frequency is not formed on each of two other unit insulation body-facing surfaces 112B.

The substantial length of the unit insulation body 211 is changed by the protrusion for adjusting natural frequency 113. That is, when the length of each of the unit insulation bodies 211 is defined as length from the unit insulation body-facing surface 112 of the center core 110 to the cylindrical casing 120, the length of the corresponding unit insulation body 211 decreases by a degree to which the protrusion 113 for adjusting natural frequency protrudes.

In addition, the natural frequency of the unit insulation body 211 is inversely proportional to the square of the length of the unit insulation body 211.

Accordingly, when the length of the unit insulation body 211 is changed, the natural frequency of the unit insulation body 211 is changed greatly.

In consideration of this, the length of each of the unit insulation bodies 211 is changed such that the natural frequency of each of the unit insulation bodies 211 is different from each other, or the length of at least one unit insulation body 211 and the length of another unit insulation body 211 are made to be different from each other such that the natural frequency of the at least one unit insulation body 211 is different from the natural frequency of the another unit insulation body 211. In this case, the resonance frequencies (or peak frequencies) of the unit insulation bodies 211 having different natural frequencies become different from each other, so the resonance energy of the unit insulation bodies 211 may be distributed.

Of course, according to an embodiment, the protrusion 113 for adjusting natural frequency may be not formed, and the separation grooves 212 may be designed to be formed asymmetrically so as to allow the unit insulation bodies 211 to have areas different from each other such that the unit insulation bodies 211 have different natural frequencies.

As described above, in the conventional technology, the entirety of the rubber insulator has the same natural frequency. Accordingly, large resonance energy K* occurs in the natural frequency, but in the embodiment, the resonance energy can be distributed by allowing one or at least two of the plurality of unit insulation bodies 211 to have natural frequencies different from the natural frequency of another unit insulation body 211.

That is, when all of the natural frequencies of the unit insulation bodies 211 are different from each other, or when the natural frequency of at least one unit insulation body 211 is different from the natural frequencies of other unit insulation bodies 211, the resonance frequencies (peak frequencies) of the unit insulation bodies 211 having different natural frequencies are different from each other, so the resonance energy can be distributed.

In the embodiment, the plurality of separation grooves 212 is formed in the insulation body at the same intervals along the circumferential direction of the insulation body, and the protrusions 113 for adjusting natural frequency are formed on the unit insulation body-facing surfaces such that the unit insulation bodies 211 have resonance frequencies different from each other.

However, according to an embodiment, the plurality separation grooves 212 may not formed in the insulation body at the same intervals along the circumferential direction of the insulation body such that the unit insulation bodies have resonance frequencies different from each other.

The above description of the present disclosure is only for illustrative purposes, and those skilled in the art will appreciate that various modifications are possible without departing from the scope and spirit of the present disclosure. Therefore, it should be understood that the embodiment described above is illustrative in all respects and not limiting. For example, each component described as a single type may be implemented in a distributed manner, and similarly, components described as being distributed may also be implemented in a combined form.

The scope of the present disclosure is indicated by the claims to be described later rather than the detailed description, and it should be interpreted that all changes or modified forms derived from the meaning and scope of the claims and concept equivalent thereto are included in the scope of the present disclosure.

What is claimed is:

1. A vibration damping device for a vehicle, the vibration damping device comprising:
a center core;
a cylindrical casing spaced apart from the center core and provided under the center core; and
a rubber insulator having a radial inner side of an upper end part of the rubber insulator bonded to the center core and having a radial outer side of a lower end part of the rubber insulator bonded to an inner circumferential surface of the cylindrical casing and comprising an insulation body having a conical shape extending radially outward and downward from the center core to the cylindrical casing,
wherein the insulation body comprises a plurality of separation grooves formed in the insulation body to have shapes extending in radial directions such that the insulation body is divided into a plurality of unit insulation bodies along a circumferential direction of the insulation body, and
one or more unit insulation bodies have different natural frequencies.

2. The vibration damping device of claim 1, wherein one or more unit insulation body-facing surfaces facing the unit insulation bodies in the center core have a protrusion for adjusting natural frequency.

3. The vibration damping device of claim 1, wherein each of the separation grooves does not pass through the insulation body and has a shape of a groove indented from an inner circumferential surface of the insulation body toward an outer circumferential surface of the insulation body.

* * * * *